April 28, 1964  F. A. CRESWICK  3,130,716
INTERNAL COMBUSTION ENGINE
Filed June 18, 1962  3 Sheets-Sheet 1

INVENTOR
FREDERICK A. CRESWICK
BY *John B. Hummutrout*
ATTORNEY

April 28, 1964 F. A. CRESWICK 3,130,716
INTERNAL COMBUSTION ENGINE
Filed June 18, 1962 3 Sheets-Sheet 2

INVENTOR
FREDERICK A. CRESWICK
BY *John B. Summerheart*
ATTORNEY

April 28, 1964   F. A. CRESWICK   3,130,716
INTERNAL COMBUSTION ENGINE
Filed June 18, 1962   3 Sheets-Sheet 3

INVENTOR
FREDERICK A. CRESWICK
BY
ATTORNEY

United States Patent Office 3,130,716
Patented Apr. 28, 1964

3,130,716
INTERNAL COMBUSTION ENGINE
Frederick A. Creswick, Columbus, Ohio, assignor to Battelle Memorial Institute, Columbus, Ohio, a corporation of Ohio
Filed June 18, 1962, Ser. No. 203,136
14 Claims. (Cl. 123—46)

This invention relates to internal combustion engines and improvements therein involving fuel injection, and is more particularly concerned with two-stroke-cycle internal combustion engines which for operation include fuel injecting means.

An object of the present invention is the provision of an internal combustion engine having fuel injecting means in which pneumatic energy and a quantity of fuel are stored in readiness for injection of the fuel charge to the engine combustion space to be achieved under power derived from the stored pneumatic energy.

Another object of this invention is the provision of an internal combustion engine having pressure-responsive fuel injecting means which is well protected against being actuated to inject fuel to the engine except at the proper time.

Another object of this invention is that of providing an internal combustion engine in which fuel injecting means is responsive to pneumatic pressure, developed by the engine, to take in a charge of fuel during each cycle of the engine operation, and stores pneumatic fluid under powerful actuating pressure which is effective with reference to position of the engine piston means to promote the injection of the charge to the engine for compression and combustion.

Another object of this invention is the provision of an internal combustion engine which produces pneumatic fluid pressure fluctuating from high to relatively low values per cycle of the engine and, in which engine, pressure-responsive fuel injecting means picks off and stores for its ultimate actuation a relatively high pressure from the fluctuating pressure.

A further object of this invention is the provision of an internal combustion engine having fuel injecting means which reliably introduces a like charge of fuel to the engine combustion chamber space for each cycle of a series of cycles of the engine, thus tending to stabilize the engine operation.

A still further object is the provision of an internal combustion engine of the character indicated and in which the fuel injecting means maintains the engine on substantially constant fuel quantity input from cycle to cycle and for this purpose is adjustable so that the quantity of fuel taken in and stored in readiness for injection may be varied to arrive at an amount of fuel which thereafter is reliably kept substantially constant from cycle to cycle.

Another object of this invention is the provision of an internal combustion engine in which pressure-responsive fuel injecting means storing high pneumatic pressure from a pneumatic fluid compressing action of the engine piston means per cycle of the engine operation is positively triggered with reference to position of the engine piston means, whereupon pneumatic energy is powerfully effective immediately after the triggering to drive the fuel injecting means for injection of the next fuel charge to the engine for compression and combustion.

A still further object is the provision of an internal combustion engine of the character indicated in which quantity of scavenge air introduced to combustion chamber space of the engine is varied as a function of the quantity of fuel being charged by the injecting means, thus to keep a substantially constant fuel-air ratio in the mixture of fuel and air provided for compression and combustion.

Another object is the provision of a two-stroke-cycle internal combustion free-piston engine having compression space associated with the free-piston means for the engine to produce pneumatic pressure fluctuating from high to relatively low values per cycle of the engine, and in which engine pressure-responsive fuel injecting means picks off and stores for its actuation a relatively high pressure from the fluctuating pressure and is thereafter triggered in response to movement of the free-piston means to render the stored pressure active for injection of the charge at the proper time to the engine for compression and combustion.

Another object is the provision of a two-stroke-cycle internal combustion free-piston engine wherein the piston means operates to compress bounce air on one of the strokes per cycle and to compress air for purposes including scavenging of the combustion space on the other of the strokes per cycle, and which engine has pressure-responsive fuel injecting means which operates to take in and store a charge of fuel in response to pressure of air being compressed by the free-piston means and store pneumatic energy from fluid being compressed by the free-piston means for the fuel injecting means to be actuated and thus inject fuel to the engine each cycle of the engine.

A further object is the provision of a free-piston engine of character indicated in which the free-piston means compresses fluid in bounce chamber space and in scavenge air and re-bounce chamber space while the pressure-responsive fuel injecting means responds to peak pressure of air being compressed by the piston means to take in fuel and store energy for injection of the fuel.

Another object of this invention is that of providing a free-piston internal combustion engine having a scavenge air intake port and a combustion gas exhaust port which are covered and uncovered by the free-piston means each cycle of the engine, and in which pressure-responsive fuel injecting means takes on and holds pneumatic fluid under pressure and a charge of fuel and is so triggered that the pressure of pneumatic fluid being held is effective for operating the fuel injecting means in a fuel charge injecting movement immediately after the scavenge air and combustion gas exhaust ports are closed by the free-piston means on fuel compression stroke.

Other objects in part will be obvious and in part pointed out more fully hereinafter.

As conducive to a clearer understanding of certain features of the present invention, it may be noted at this point that in internal combustion engines such as two-stroke-cycle engines it has been found to be of definite advantage to use a fuel injection system to introduce fuel when this form of system is compared with a carburetion system. Among the advantages obtained in the use of a fuel injection system are greater efficiency and remarkably safer operation. With reference to a two-stroke-cycle internal combustion engine, the exhaust ports remain open until after air input and scavenging occur in the combustion space and these ports are closed for the combustible charge compression phase of the engine. In employing a fuel injection system, the fuel is injected on the compression stroke after the exhaust ports are closed. Should one resort to the use of a carburetion system, however, a portion of the fuel admitted with the intake air during scavenging would pass out through the exhaust ports prior to closure of these ports on the compression stroke. The fuel thus carried out through the exhaust system of the engine into the surrounding atmosphere of course represents a loss of fuel from the combustion phase and produces a lower operating efficiency for the engine. In addition to loss of efficiency in this respect, the introduction of fuel with escape to the atmosphere ambient to the engine can create a safety hazard. This latter disadvantage becomes all the more acute in situations where the engine is located in a confined space and for example where highly combustible natural gas type fuels are being burned in the engine.

Among two-stroke-cycle internal combustion engines are free-piston engines. Basically, free-piston internal combustion engines are single or plural piston engines in which the piston or pistons undergo reciprocation to exert a power stroke deriving energy from a corresponding charge of fuel ignited and burned in combustion space wherein the force of expansion of burning fuel is transmitted to the piston means. The return stroke, which brings the piston means back to beginning another power stroke, occurs as a bounce prompted by action of bounce energy which is stored from the preceding power stroke and introduced for the return stroke. The motion of the piston or pistons thus is not mechanically restrained in the well-known sense of crank type engines having connecting rods associated with the piston means and a crank shaft; instead, the piston means reciprocates between inner and outer dead positions where, respectively, travel of the piston means reverses while being restricted beyond these positions by fluid pressure. These free-piston engines are used for many different purposes and in certain instances are combined with a refrigeration compressor in an air conditioner for residential or other use, including commercial use, heat pump systems, and the like.

Certain fuel injecting systems heretofore used in internal combustion engines are not susceptible to accurate control for the input of fuel to the engine in a consistent manner. The reliable injection of fuel to such engines as free-piston internal combustion engines is a quite important factor considering that free-piston engines are prone to have erratic operation when balanced conditions pneumatically at the ends of the piston means are altered. One of the factors affecting the piston movement thus is the reproducibility of a fuel charge introduced from cycle to cycle for combustion. There are certain fuel injecting systems in the prior art which rely upon pressure actuation of the fuel injecting means, but the fuel charge injection usually depends upon the development of a pressure which reaches a magnitude needed for actuating the injector only when the piston means of the engine has approximately the position in stroke where the actual injection of the fuel is to occur. The response of the injector under these conditions sometimes is susceptible to variation and the injection may thus delay or advance with respect to the piston movement from cycle to cycle. The timing may in fact be such that injection occurs in certain instances prior to closure of the engine exhaust ports on the compression stroke immediately preceding compression of the fuel and ignition.

An outstanding object of the present invention accordingly is the provision of a two-stroke-cycle free-piston internal combustion engine having well timed, positive action fuel injection means which reliably injects a like charge of fuel to the engine combustion space for each power stroke of a series of cycle of the free-piston means of the engine, and the fuel charged is burned in the engine combustion space for the engine to accomplish those power strokes without substantial combustion power input variation from cycle to cycle thereof.

In the accompanying drawing illustrating certain embodiments of the present invention:

Figure 3:
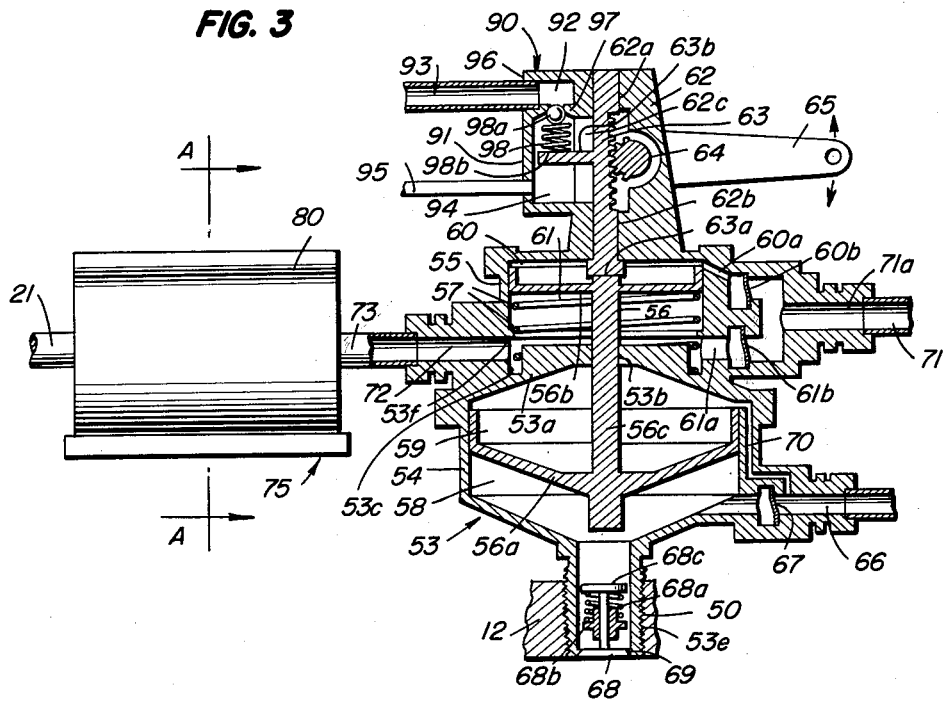
FIGURE 3 depicts fuel injecting means of the engine, mainly in sectional elevation, and a control valve of the injector in full elevation.
Figure 3A:
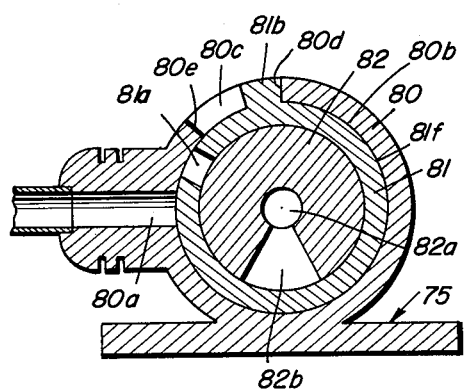
Figure 3B:
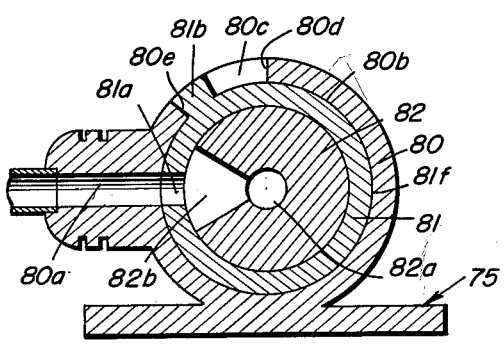
Figure 3C:
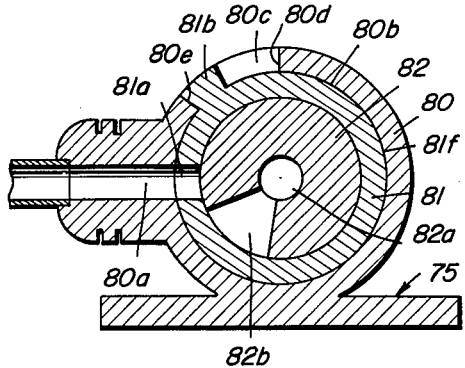
Figure 3D:
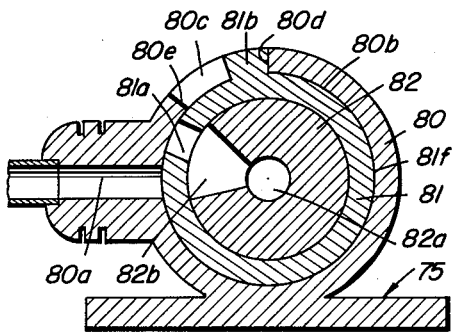
Figure 4:
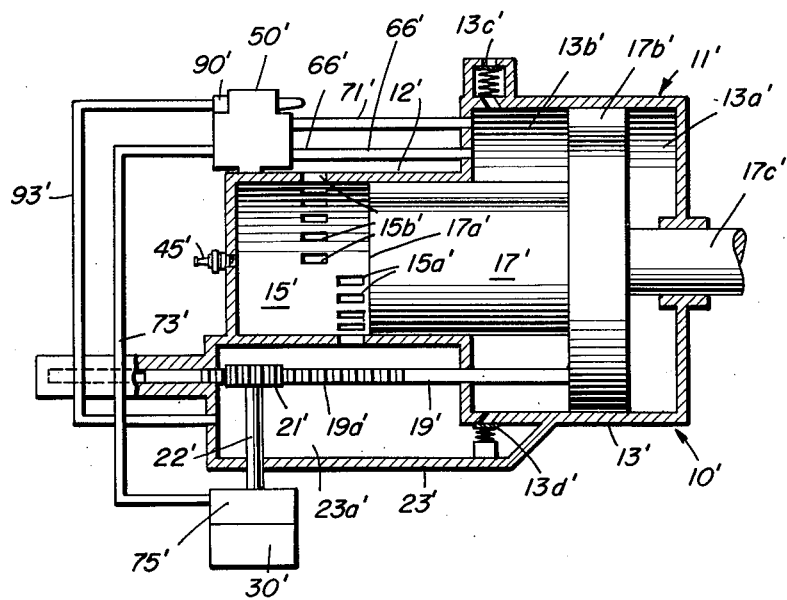

FIGURES 3A, 3B, 3C, and 3D are sectional elevations respectively taken through the control valve on line A—A in FIGURE 3 and representing different positions of this valve during the engine operation; and FIGURE 4 is a schematic horizontal sectional plan view of a two-stroke-cycle free-piston engine having a single engine piston unit.

Figure 1:
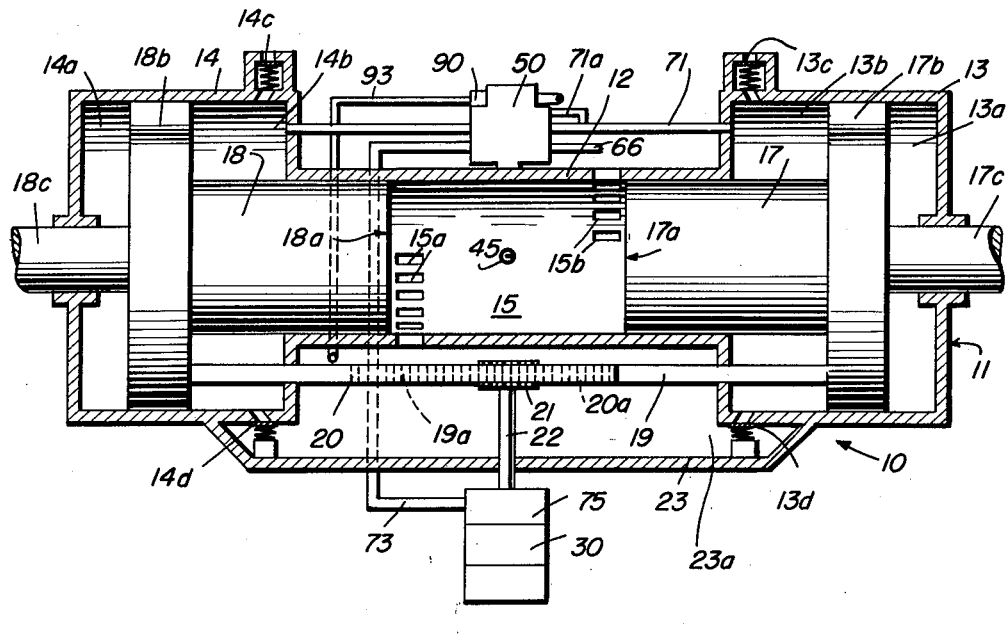
FIGURE 1 is a schematic horizontal sectional plan view of a two-stroke-cycle opposed plural piston free-piston engine.

Referring now more particularly to the embodiment represented in FIGURE 1, a two-stroke-cycle free-piston engine 10 is provided having a casing 11 and piston means reciprocatively disposed within the casing. The free-piston engine in the present instance is a twin opposed piston engine including axially aligned reciprocative free-piston units 17 and 18. These piston units are housed within cylindrical means provided by the casing 11 and more particularly are within an internal combustion power cylinder 12 having axial alignment and fixed position relative to pneumatic cylinders 13 and 14 which receive the respective piston units. Thus, adjacent end faces 17a and 18a of the free-piston units 17 and 18 are in opposed positions within the internal combustion power cylinder 12, and forming a combustion chamber 15 with the latter cylinder. From the combustion chamber the free-piston unit 17 extends outward lengthwise and has a cylinder space partitioning piston portion 17b in the pneumatic cylinder 13. Portion 17b has a larger diameter than the power face 17a of the related piston unit and divides space within the pneumatic cylinder 13 into an outer bounce chamber 13a and an inner scavenge and re-bounce chamber 13b. The free-piston unit 18 is a counterpart of the companion piston unit 17 and extends lengthwise in a direction which is opposite to that of the latter piston unit from the combustion chamber 15. A cylindrical space partitioning portion 18b of the piston unit 18 is of larger diameter than the power face 18a and sub-divides the pneumatic cylinder 14 into an outer bounce air chamber 14a and a scavenge re-bounce chamber 14b.

Reciprocative piston units 17 and 18 are synchronized by means including synchronizer bars 19 and 20 respectively fixed at ends to the piston portions 17b and 18b and racks 19a and 20a are on the bars at adjacent overlapping ends of the bars. The racks mesh with a synchronizing gear 21 on diametrically opposite sides of the gear and the gear is splined or otherwise securely on a shaft 22 suitably journaled on the engine casing 11 for the gear and the shaft to rotate on a fixed axis in response to reciprocation of the piston units 17 and 18. The bars and gear thus are so engaged as to maintain like phase reciprocation of these piston units, the direction of the gear rotation being reversed as strokes of the piston units reverses.

The scavenge and re-bounce chambers 13b and 14b have pressure-responsive air-admission and anti-backflow means in the form of valves 13c and 14c, which are one-way check valves, and ports in the cylinder walls of these chambers controlled by the latter valves, for the valves and ports to have anti-backflow output from the air ambient to the engine to the scavenge air re-bounce chamber space of the respective chambers. Still further, the scavenge and re-bounce chambers 13b and 14b are in communication with scavenge air accumulator means which includes an air box 23 within which there is a scavenge air chamber 23a. This communication is had through pressure-responsive scavenge air egress and anti-backflow means represented by ports extending from chambers 17b and 18b respectively into the air box 23 and by one-way check valves 13d and 14d which control the ports. Combustion chamber 15, for outer positions of the engine piston units 17 and 18, is open to the air box chamber 23a by having air inlet ports 15a in the wall of the combustion power cylinder 12 and is open for the exhaust of gases through exhaust ports 15b in the wall of combustion power cylinder 12.

The engine 10 may be engaged to a work load, and thus for example the piston units 17 and 18 are provided having axial extensions 17c and 18c which pass reciprocatively and sealing through opposite walls of the engine casing 11, such as to drive a compressor constructed and operating in the manner set forth in the co-pending application Serial No. 203,344, of R. J. McCrory et al., filed June 18, 1962.

For ignition, the internal combustion free-piston engine 10 includes an igniting device 30 suitably mounted on the engine casing 11 and which is energized in timed relation with the stroke movements of the piston units 17 and 18. Since there is no flywheel effect to keep the piston units reciprocating in the event of combustion failure, an adequate ignition potential along with proper coordination of the timing of this potential with fuel and pressure conditions in the combustion chamber 15 are important. The particular form of ignition device relied upon for this coordination in the present illustrative embodiment includes a rotor 31 which is suitably connected to oscillate with the synchronizer gear shaft 22 as the gear shaft is oscillated in response to the drive of racks 19a and 20a in mesh with the synchronizing gear while these racks are being reciprocated with the piston units 17 and 18. Rotor 31 has a circular cam track which includes track portion 31a and track portion 31b. These two track portions just mentioned are transitionally interconnected by an inclined portion 31c of the track. The ignition unit also includes a housing 32 having a cover 32a joined with the remainder of the housing such as by machine screws 32b. Shaft 22 of the synchronizing gear extends through the housing wherein the rotor 31 is accommodated along with other components of the igniting device which are now to be described. A hammer 33 having a cylinder head 33a slidable within a bore 34 inside the housing is equipped with a roller 33b which is a follower for the cam track of rotor 31. A wall 35 situated on the opposite side of the hammer from the roller 33b has an annular groove 35a which accommodates one end of a helical spring 36. The spring biases the hammer 33 into contact of its roller with the cam track portion 31a.

Anvil member 37, slidable in an aperture 35b in the wall 35, has an anvil face 37a and a socketed opposite end 37b. A shaped member 38 fixed inside the housing 32 as by being formed integral with the housing provides a socket 38a which is aligned with the socket 37b and opposes the latter socket. A pair of piezoelectric crystals 39 have ends of like polarity received in the respective sockets which are electrically conductive and connected in any suitable manner such as through the casing 32 itself to a terminal 40 which for example is grounded to the combustion cylinder 12. Opposite like poles of the piezoelectric crystals 39 abut a pole plate 41 which has lead connection 11a to the engine ignition switch 42. A helical spring 43 has one of its ends in an annular groove 35c in wall 35 while the opposite end of the spring presses against socketed member 37 so that the crystals 39 are firmly retained in the socket of this member and that of socketed portion 38a. Extending from the output side of the switch is a lead 44 which is connected to a sparking device such as a spark plug 45 (see FIGURE 1) having spark output within the combustion chamber 15 and ground connection to the combustion cylinder 12 on the opposite side of the spark gap from the potential of lead 44.

When the synchronizing gear shaft 22 is rotated in a direction corresponding to inward movement of the engine piston units 17 and 18, the hammer roller 33b follows the cam track portion 31a until the inclined track portion 31c encounters the roller and imparts impetus to the hammer 33 which accordingly moves against the bias of spring 36 and impacts against the anvil face 37a of the anvil member 37. This impact imposes pressure upon the piezoelectric crystals 39 and a potential is momentarily produced and transmitted across the spark gap of the sparking device 45 to produce a spark which ignites a properly compressed charge of fuel and air in the combustion chamber 15 of the free-piston engine. As the compression stroke of the piston units 17 and 18 are thereafter being terminated, the track portion 31b of the ignition rotor allows movement of the hammer 33 away from the anvil face 37a a sufficient distance to relieve spark generating pressure on the piezoelectric crystals. Thus, rotor 31 when reversed in direction of rotation under the drive of racks 19 and 20 in mesh with the synchronizing gear 21 on power stroke of the engine allows the hammer roller 33b to follow back down track portion 31c to track portion 31a thereby conditioning the ignition device for the next compression stroke of the piston units 17 and 18 relative to the combustion chamber 15.

Fuel for combustion in the chamber 15 of the engine 10 is supplied in quantity which from compression stroke to compression stroke of the piston units 17 and 18 is substantially constant and the supply is so timed in relation to scavenging of the combustion chamber and compression of fuel that the new charge of fuel will be available for ignition for the next power stroke of piston units 17 and 18. A fuel input device in the present embodiment (see FIGURES 1 and 3) includes an injector 50 which is capable of pumping at intake pressure a volume of fuel such as natural gas and storing the fuel for the engine combustion chamber on each cycle of operation of the engine. The fuel injector comprises a casing 53 having a partition 53a therein, a pump compartment 54 and an actuation compartment 55 whereby the pump and actuation compartments are on opposite sides of the partition just mentioned. The injector 50 further includes pulsational means comprising an injector piston unit 56 and a helical spring 57 biasing this piston unit in one of its directions of stroke. A cylindrical pump portion 56a of the injector piston unit is reciprocatively within the pump compartment forming a pump chamber 58 and a balance chamber 59 with the pump compartment and has a cylindrical actuator portion 56b reciprocatively within the actuation compartment and forming a first storage chamber 60 for pneumatic fluid and a second storage chamber 61 for pneumatic fluid with the actuator compartment. An intermediate cylindrical portion 56c of the injector piston unit 56, having a smaller diameter than the pump and actuator portions 56a and 56b, interconnects the latter two portions for reciprocation in unison and is slidably received in an opening 53b in the casing wall 53a to permit reciprocation. The balance chamber 59 and the second storage chamber 61 are inward having the partition 53a of the casing for a dividing wall, and the pump chamber 58 and first storage chamber 60 are outward beyond corresponding ends of the injector piston unit 56. Helical spring 57 of the pulsational means of the injector is seated at one end in an annular groove 53c of the injector casing partition 53a, and the spring presses at its opposite end against actuator portion 56b of the injector piston unit 56. Stroke limit means for the injector piston unit is provided and includes an extension 62 of the casing 53, the extension affording axially aligned bores 62a and 62b which slidably accommodate the opposite end portions of a stop rod 63. An inner end face 63a of the stop rod is situated inside the first storage chamber 60 for pneumatic fluid. There are rack teeth 63b along the length of the stop rod and these teeth are in mesh with a gear segment 64 which is journaled in the casing portion 62 and is operatively connected with a fuel control lever 65 of the injector. Rotation of the gear segment as by manual or suitable automatic operation of the fuel lever slidably adjusts the stop rod and alters the position of the stop rod face 63a in the chamber 60. A stop ledge 53f integral with the injector casing 53 and projecting radially into chamber 61 limits movement of the injector piston unit in the opposite direction of stroke.

Pressure-responsive fuel-influx and anti-backflow means leading from suitable fuel supply (not shown) communicates with the pump chamber 58 and illustratively includes fuel input line 66 and a one-way check valve 67 which has input to the pump chamber. Pressure-responsive fuel-egress and anti-backflow means having input from the pump chamber 58 and including a fuel output poppet valve 68 communicates with the combustion chamber 15 of the free-piston engine. Conveniently the injector casing has a tubular extension 53e provided with external threads for engagement with companion threads in the wall of a bore in the engine combustion cylinder 12, thus placing injector opening 69 in communication with the combustion chamber 15. Poppet valve 68 has a conical seat against the tubular extension 53e at outlet opening 69 and the valve is normally biased closed by means of a helical spring 68a associated with a spider mount 68b for the stem of the poppet valve and an enlarged inner end 68c of this valve. A bleed passage 70 interconnecting the fuel line 66 and balance chamber 59 amounts to a relief vent preceding the check valve 67 in the direction of fuel supply. The vent allows pressure in the balance chamber to adjust to fuel intake pressure of the injector piston unit 56 in each cycle of operation of this unit.

Pressure-responsive fluid-influx and anti-backflow means having input from pneumatic compression chamber space and anti-backflow output to each the first storage chamber 60 and the second storage chamber 61 of the injector enables fluid to be stored at high pressure in these chambers after the high pressure is picked off from a fluctuating pressure which ranges from high to relatively low in compression chamber space of the engine during operation of the free-piston engine 10. Thus, for example, the scavenge and re-bounce air chambers 13b and 14b of the engine compressor 10 are in communication through an air inlet line 71 with the respective storage chambers 60 and 61 and in this regard supply orifices 60a and 61a respectively communicating with the chambers 60 and 61 in the actuating cylinder of the injector. Orifice 60a, preferably, is a relatively constricted orifice to introduce lag as compared with the orifice 61a and one-way check valves 60b and 61b, which illustratively are reed valves, correspond to and control the latter orifices. An outlet 72 from the second storage chamber 61 is connected by line 73 with a timing valve 75 which controls opening and closing of this outlet.

The pneumatic storage chambers 60 and 61 receive air from the scavenge re-bounce air chambers 13b and 14b through line 71 and this air is admitted by the one-way valves 60b and 61b thence through orifices 60a and 61a to the respective storage chambers.

Fluid under peak pressure from the scavenge re-bounce air chambers 13b and 14b is admitted through line 71 interconnecting these chambers and through tap line 71a which leads from the latter line to valve 60b and thence into first storage chamber 60 through orifice 60a. The tendency of fluid pressure in the chamber 60 is to produce action against the bias of helical spring 57; however, the second storage chamber 61 also is open to the peak pressure of fluid in line 71 in this instance through valve 61b and orifice 61a and, as pressure is equalized in the two storage chambers, the force of helical spring 57 controls to actuate the injector piston unit 56 to a position where abutment of the unit is had against face 63a of the stop rod 63. In this movement, volume increase in the pump chamber 58 of the injector promotes opening of the one-way check valve 67 and a metered charge of fuel accordingly enters the latter chamber. Injection of fuel into the combustion chamber 15 of the free-piston engine 10 will occur through discharge opening 69 which is opened by movement of poppet valve 68 against its biasing spring 68a under pressure of the fuel in the pump chamber 58 when pressure in the second storage chamber 61 of the injector is released. This pressure release is governed by operation of the timing valve 75. The fuel intake and output capacity of the injector 50 may be varied by re-setting the position of the stop rod 63 through adjustment of the position of the fuel lever 65.

To give a general view of bounce, scavenging and other general operations of the free-piston engine 10, let it be assumed for the moment that the piston units 17 and 18 are at an outer dead position of piston travel. Pneumatic fluid in the outer bounce chambers 13a and 14a has stored energy to return or at least to assist return of the piston units to inner dead position. In moving inward the piston units 17 and 18 cover the scavenge air inlet ports 15a and exhaust ports 15b, immediately after which fuel is injected by the injector 50 and the engine piston units continue to move toward each other compressing the charge in the combustion chamber 15. Meanwhile, piston components 17b and 18b act on air in chambers 13b and 14b to force air into the air box chamber 23a through ports controlled by the one-way check valves 13d and 14d. As the piston units 17 and 18 move farther inward the ports controlled by the check valves 13d and 14d are covered by the piston components 17b and 18b and air in advance of the related piston units then is compressed in the remaining volumes of chambers 13b and 14b to store pneumatic re-bounce energy to aid the next power stroke of the piston units 17 and 18.

As the inner dead position of piston units 17 and 18 is approached, the air-fuel mixture in the combustion chamber is ignited by operation of the ignition means 30 under drive of the synchronizing gear 21 and the energy thus produced drives the piston units 17 and 18 in a power stroke which is aided initially by the re-bounce pneumatic pressure in chambers 13b and 14b. As the power stroke progresses, air is taken into the scavenge and re-bounce air chambers 13b and 14b through valves 13c and 14c while the check valves 13d and 14d are closed. Continued movement of the pison units 17 and 18 causes the scavenge air inlet ports 15a and exhaust ports 15b to open, and air under existing pressure in the air body chamber 23a is admitted through ports 15a in fresh supply and the combustion gases in chamber 15 have exit through the outlet ports 15a. The outer bounce chambers 13a and 14a undergo decrease in volume as the piston units 17 and 18 approach outer dead position and pneumatic energy is stored for the return stroke of the piston units.

The fuel injector timing valve 75 includes a stationary cage 80 (see FIGURE 3A) in which there is a discharge port 80a leading for example to atmosphere ambient to the free-piston engine 10. The stationary cage supports within a cylindrical bore 80b thereof a hollow cylindrical rotatable cage 81 having a radial outlet port 81a which by rotation of the rotatable cage is adapted to be aligned with port 80a in the stationary cage and is shut off by the stationary cage in the absence of alignment of the ports.

Radial projection 81b of the rotatable cage extends outwardly through a peripherical slot 80c in the wall of the stationary cage. One end 80e of the slot 80c acts as an abutment of the radial projection 81b to stop rotation of the rotatable cage at a point where outlet 81a is aligned with outlet 80a of the respective cages. The arcuate length of slot 80c on the periphery of the stationary cage is sufficient for ports 80a and 81a to be out of alignment and thus closed with respect to each other when the radial projection 81b has been rotated into abutment against edge 80d of the slot.

The timing valve 75 also has a rotary cylindrical core 82 in driven connection with shaft 22 of the synchronizing gear 21 thus for the core to oscillate with the gear under the drive of the gear. The core 82 is received rotatably within bore 81f of the cage 81; however, the resistance of the core to rotate relative to the cage 81 is greater than the resistance of cage 81 to rotate within cage 80. These differences in resistance may be assured by coefficient in friction of the adjacent members and in whole or in part of any other suitable arrangements where the differences are properly introduced.

Rotor 82 has a central input opening 82a communicating with the output line 73 from the second storage compartment 61 of the fuel injector 50, and has a radially open sector 82b. From the FIGURE 3A positions of the core 82 and rotary cage 81, corresponding to outer dead position of the engine piston units 17 and 18, a counter-clockwise rotation of the core 82 at the outset of the return stroke of the engine piston units is effected under drive of the synchronizing gear 21 and brings the radial projection 81b of the rotatable cage into contact with abutment 80e thus aligning ports 80a and 81a and then a continued rotation of the core in the counterclockwise direction provides the FIGURE 3B position of the valve wherein sector 82b is open to the ports 80a and 81a. This alignment is timed to occur immediately after closure of the scavenge air inlet ports 15a and exhaust ports 15b of the combustion chamber 15 by the piston units 17 and 18 on the return stroke of these piston units, and this vents the second storage chamber 61 of the injector to a relatively low pressure. The pressure of fluid stored in the first pneumatic storage chamber 60 of the injector then prevails against spring 57 and exercises a force which drives the injector piston unit 56 in a fuel expelling stroke in which a measured quantity of fuel in the pump chamber 58 is discharged through port 69 controlled by the pressure-responsive poppet valve 68, while the one-way check valve 67 remains closed.

As the valve core 82 continues to rotate counterclockwise to the FIGURE 3C position the core sector 82b passes the aperture 81a by relative rotation with respect to the rotatable cage 81 while the latter cage remains fixed against rotation in the counterclockwise direction by reason of projection 81b being restrained by abutment against edge 80e of the slot 80c. After shut off between sector 82b and port 81a occurs, in the manner indicated, fluid from the scavenge and re-bounce cylinders 13b and 14b reaches a re-bounce pressure stage following closure of valves 13d and 14d between the scavenge air and re-bounce chambers 13b and 14b and the air body chamber 23a, and the pressure is effective to open valves 60b and 61b, controlling the first and second storage chambers 60 and 61 of the fuel injector, with the result that fluid pressure on both sides of the actuator portion 56b of the injector piston unit equalizes making spring 57 effective to drive the injector piston unit 56 in an intake stroke during which time another measured quantity of fuel is taken into the pump chamber 58 through check valve 67. At the end of this stroke of the injector piston unit 56 the latter unit is in abutment against the face 63a of the stop rod 63. Meanwhile, fuel in the engine compressor combustion chamber 15 is compressed and ignition occurs by operation of the igniting device 30 in the manner hereinbefore described.

At the outset of the power stroke of the engine piston units 17 and 18 the direction of rotation of valve core 82 is reversed to clockwise rotation from the FIGURE 3C position and at the outset of this rotation the rotary cage 81 and core 82 rotate as a unit in the stationary cage 80, whereby radial projection 81b advances from stop 80e to stop 80d while port 81a moves away from port 80a and the latter port is closed off by the rotary cage from the injector chamber 61. Chamber 61 in fact remains closed throughout the power stroke of the free-piston unit compressor 10, during which time core 82 continues to rotate clockwise as viewed in FIGURE 3D. The next return stroke of the piston unit 17 and 18 is accompanied by counterclockwise rotation of valve core 82 and the rotatable cage 81 once more as a unit until the radial projection 81b of the rotating cage strikes abutment 80e of the stationary cage, following which counterclockwise rotation of core 82 continues with respect to cage 81 until sector 82b comes into alignment again with ports 80a and 81a to vent the second pneumatic storage chamber of the fuel injector, thus permitting the injector piston unit 56 to effect another stroke discharging fuel into the engine combustion chamber 15.

Variable air bleed-off means 90 having a housing 91 integral with the extension 62 of the injector casing includes a pressure chamber 92 in communication with chamber 23a of the accumulator through the interconnecting air supply line 93. An air outlet chamber 94 within the housing 91 is in communication through outlet port 95 in the housing to the air ambient to the engine 10 and is in communication with pressure chamber 92 through a port 96 in a partition 97 between the respective chambers within the housing. The face of the partition 97 on the side next to the outlet chamber 94 affords a seat surrounding the port 96 which accommodates a ball 98a of an adjustable pressure-responsive valve means 98 which is operably connected with stop rod 63 by having a helical spring 98b resting securely on one end upon a lateral extension 63b of the stop rod and at the other end against ball 98a thus seating the ball sealing against partition 97 for the ball normally to maintain port 96 closed. Extension 63b is accommodated in a linear slot 62c in portion 62 of the injector casing and the slot is directed lengthwise along the axis of the stop rod 63 to permit the rod and its extension to move as a unit thus varying the compression of the helical spring 98b. The arrangement further is such that the average pressure of air held available in the accumulator 23 for air input and scavenging of the combustion chamber 15 is varied as a function of length of stroke of the injector piston unit 56 for the engine 10 to operate on a substantially constant fuel-air ratio although the quantity of fuel per charge to the engine combustion chamber may vary with length of stroke of the injector piston unit. Thus, as the control lever 65 of the injector 50 is being set to a new position by clockwise rotation of the lever as viewed in FIGURE 3, the stop rod is moved outward to increase the permissible length of stroke of the injector piston unit 56 and the compression of valve spring 98b. For the new position of stop rod face 63a thus determined in chamber 60, valve 98 retains port 96 closed for higher average air pressure to prevail in the accumulator 23 before ball 98a is unseated for air to escape from the accumulator through line 93 through the bleed-off means 90 and out port 95 to atmosphere. The higher accumulator pressures promote the introduction of a larger quantity to the combustion chamber per cycle of the engine and thus more effective scavenging occurs leaving an increased amount of oxygen available to the fuel in the combustion chamber 15 after the exhaust ports 15b are closed on each cycle of the engine piston units 17 and 18. A movement of the injector control lever 65 counterclockwise as viewed in FIGURE 3 reduces the compression of the valve spring 98b and shortens the permissible stroke length of the injector piston unit 56 with the result that the decreased amount of fuel injected per cycle of the engine for the new setting of the injector is accompanied by a reduced average air pressure of the accumulator 23 and a reduced amount of oxygen available to the fuel in the combustion chamber for each power stroke of the engine.

In the embodiment represented in FIGURE 4, a two-stroke-cycle free-piston engine 10' has but a single engine piston 17', within the casing 11' and the single piston forms with the casing a bounce air chamber 13a' and a scavenge air and re-bounce chamber 13b'. The latter two chambers have for a partition a portion 17b' of the piston and are inside the pneumatic air cylinder 13' of the engine casing, while a reduced portion of the piston, having the power face 17a', forms a combustion chamber 15' with the power cylinder 12' of the engine casing. A power extension 17c' of the piston conveniently is provided sealingly and reciprocatively through casing 11' for the engine 10' to operate against a work load such as that of a compressor for a refrigerant or other gaseous fluid.

An air accumulator 23' provides a scavenge air chamber 23a' which is in communication with the engine combustion chamber 15' on one side of the power cylinder 12' through air inlet ports 15a' in the power cylinder wall. On the other side of the power cylinder 12' from the accumulator 23', the combustion chamber is in communication with the atmosphere ambient to the engine through exhaust ports 15b' in the power cylinder wall. Ports 15a' are spaced axially of the power cylinder from ports 15b' and are relatively farther removed from the power face 17a' of the engine piston than are the latter ports. Thus, the ports 15a' and 15b' are sequentially opened and sequentially closed by the engine piston 17' per cycle of the engine. One-way check valves 13c' and 13d' controlling inlets through the wall of cylinder 13', respectively admit air to the scavenge air and re-bounce chamber on power stroke of the piston 17' and discharge air from the latter chamber to the air chamber 23a' on return stroke of the piston. The piston blocks the discharge of valve 13d' toward the end of the return stroke thus converting the chamber 13b' to the development of re-bounce energy.

Figure 2:
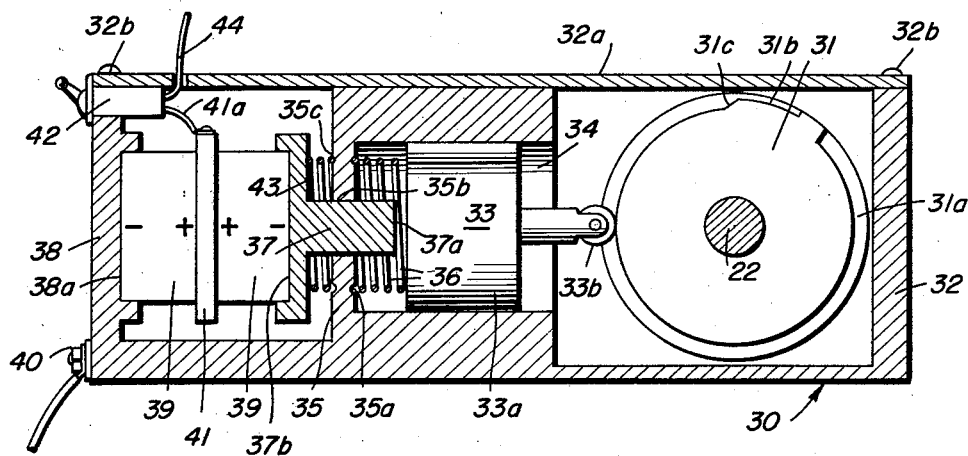
FIGURE 2 is a detailed view in sectional elevation of a spark ignition device of the free-piston engine.

A spark plug 45' mounted on the engine power cylinder 12' and extending into the combustion chamber 15' is suitably connected with an igniting device 30' of the engine to ignite fuel in the combustion chamber per cycle of the engine for power stroke of the piston 17'. The igniting device 30', suitably mounted on casing 11', is constructed and operates the same as the igniting device of FIGURE 2. A shaft 22' accordingly drives the igniting device, the shaft having thereon for rotation therewith a gear 21' which in turn is driven by connection with teeth 19a' of a rack bar 19'. Bar 19' has its opposite end mounted on the piston portion 17b' and the bar reciprocates with the piston thus to oscillate shaft 22' one cycle per cycle of the engine.

A fuel injecting device 50', having scavenge air control valve 90' thereon, is suitably secured to the engine casing 11' and has output to the combustion chamber 15' for injecting fuel to this chamber, prior to ignition, the supply being once per cycle of the engine immediately after the intake ports 15a' and exhaust ports 15b' have been closed by the piston 17'. Injecting device 50', its control valve 75' as well as the valve 90' are constructed and operate the same as the device and valves of FIGURE 3. Thus, a fuel supply line 66' connects the pump chamber of the injector with a source of fuel (not shown) and scavenge air and re-bounce chamber 13b' has input of air through line 71' to the actuator portion of the injector in the manner hereinbefore described with reference to FIGURE 3. Line 73' connects the second air storage chamber of the device with valve 75' for the valve to trigger the injector, and the valve is timed in its operation by being connected to shaft 22' to oscillate with the shaft per cycle of the engine in the manner of the valve of FIGURE 3. Chamber 23' communicates with the atmosphere through valve 90' and the interconnecting line 93' so that the fuel-air-ratio of the charges burned in the combustion chamber 15' is substantially constant although the injector may be adjusted to raise or lower the power input level of the engine, and thereafter maintain fuel quantity input to the combustion chamber 15' substantially constant from cycle to cycle of operation of the engine.

As many possible embodiments may be made of this invention and as many possible changes may be made in the embodiments hereinbefore set forth, it will be distinctly understood that all matter described herein is to be interpreted as illustrative and not as a limitation.

I claim:

1. In an internal combustion engine; cylinder means; engine piston means reciprocatively within said cylinder means and having faces respectively forming with said cylinder means a combustion chamber and compression chamber space for pneumatic fluid so that consecutive strokes of reciprocation of said engine piston means are respectively accompanied by increase and decrease in pressure of pneumatic fluid in said compression chamber space; a fuel injector actuation compartment; a fuel injector pump compartment; pressure-responsive pulsational means comprising pump and actuator portions interconnected to reciprocate in unison, said pump portion being movably in said pump compartment forming a pump chamber with said pump compartment and said actuator portion being movably in said actuation compartment partitioning said actuation compartment into first and second storage chambers for fluid; pressure-responsive fuel-influx and anti-backflow means in communication with said pump chamber; pressure-responsive fuel-egress and anti-backflow means having input from said pump chamber and in communication with said combustion chamber for output; pressure-responsive fluid-influx and anti-backflow means having input from said compression chamber space and anti-backflow output to each said first storage chamber and said second storage chamber; and fluid outlet control means in communication with said second storage chamber and operably connected with said engine piston means to open and close said second storage chamber at predetermined times during each cycle of the engine operation; whereby when said second storage chamber is closed by said fluid outlet control means said pressure-responsive pulsational means is actuated in response to increase in pressure transmitted from said compression chamber space through said pressure-responsive fluid-influx and anti-backflow means to increase volume of said pump chamber for fuel to enter said pump chamber through said fuel-influx and anti-backflow means and fluid is stored at the increased pressure in said first and second storage chambers, and whereby when said second storage chamber is opened by said fluid outlet control means pressure of the latter chamber is decreased by discharge of fluid through said outlet control means while fluid stored under pressure in said first storage chamber drives said pressure-responsive pulsational means in a fuel ejecting movement decreasing volume of said pump chamber so that fuel is ejected from the latter chamber through said pressure-responsive fuel-egress and anti-backflow means into said combustion chamber.

2. In an internal combustion engine; cylinder means; engine piston means reciprocatively within said cylinder means and having faces respectively forming with said cylinder means a combustion chamber and compression chamber space for pneumatic fluid so that consecutive strokes of reciprocation of said engine piston means are respectively accompanied by increase and decrease in pressure of pneumatic fluid in said compression chamber space; a fuel injector actuation compartment; a fuel injector pump compartment; pulsator and biasing means comprising pump and actuator portions interconnected to move in unison in a stroke under the bias thereof and in a reverse stroke against said bias, said pump portion being movably in said pump compartment forming a pump chamber and a balance chamber with said pump compartment and said actuator portion being movably in said actuation compartment partitioning said actuation compartment into first and second storage chambers for fluid; pressure-responsive fuel-influx and anti-backflow means in communication with said pump chamber and a source of fuel supply; a bleed passage in communication with said balance chamber and said source of fuel supply for pressure in said balance chamber to adjust to fuel supply pressure in response to stroke of said pulsator means; pressure-responsive fuel-egress and anti-backflow means having input from said pump chamber and in communication with said combustion chamber for output; pressure-responsive fluid-influx and anti-backflow means having input from said compression chamber space and anti-backflow output to each said first storage chamber and said second storage chamber; and fluid outlet control means in communication with said second storage chamber and operably connected with said engine piston means to open and close said second storage chamber at predetermined times during each cycle of reciprocation of said engine piston means; whereby when said second storage chamber is closed by said fluid outlet control means pressures of fluid in the latter chamber and in said first storage chamber substantially equalize in response to increase in pressure transmitted from said compression chamber space through said pressure-responsive fluid-influx and anti-backflow means and said pulsator and biasing means by movement under said bias thereof increases volume of said pump chamber for fuel to enter said pump chamber through said fuel-influx and anti-backflow means, and whereby when said second storage chamber is opened by said fluid outlet control means pressure of the latter chamber is decreased by discharge of fluid through said outlet control means while fluid stored under pressure in said first storage chamber drives said pulsator and biasing means against said bias thereof in a fuel ejecting movement decreasing volume of said pump chamber so that fuel is ejected from the latter chamber through said pressure-responsive fuel-egress and anti-backflow means into said combustion chamber.

3. In an internal combustion engine; cylinder means; engine piston means reciprocatively within said cylinder means and having faces respectively forming with said cylinder means a combustion chamber and compression chamber space for pneumatic fluid so that consecutive strokes of reciprocation of said engine piston means are respectively accompanied by increase and decrease in pressure of pneumatic fluid in said compression chamber space; a fuel injector actuation compartment; a fuel injector pump compartment; pulsator and biasing means comprising pump and actuator portions interconnected to move in unison in a stroke under the bias thereof and in a reverse stroke against said bias, said pump portion being movably in said pump compartment forming a pump chamber with said pump compartment and said actuator portion being movably in said actuation compartment partitioning said actuation compartment into first and second storage chambers for fluid; pressure-responsive fuel-influx and anti-backflow means in communication with said pump chamber; pressure-responsive fuel-egress and anti-backflow means having input from said pump chamber and in communication with said combustion chamber for output; pressure-responsive fluid-influx and anti-backflow means including first passage and pressure-responsive anti-backflow means in communication with said compression chamber space for input and with said first storage chamber for output, and second passage and pressure-responsive anti-backflow means in communication with said compression chamber space for input and with said second storage chamber for output, said first passage and pressure-responsive anti-backflow means having a smaller total effective orifice to said first storage chamber than said second passage and pressure-responsive anti-backflow means has to said second storage chamber; and fluid outlet control means in communication with said second storage chamber and operably connected with said engine piston means to open and close said second storage chamber at predetermined times during each cycle of reciprocation of said engine piston means; whereby when said second storage chamber is closed by said fluid outlet control means pressures of fluid in the latter chamber and in said first storage chamber substantially equalize in response to increase in pressure transmitted from said compression chamber space through said pressure-responsive fluid-influx and anti-backflow means and said pulsator and biasing means by movement under said bias thereof increases volume of said pump chamber for fuel to enter said pump chamber through said fuel-influx and anti-backflow means, and whereby when said second storage chamber is opened by said fluid outlet control means pressures of the latter chamber is decreased by discharge of fluid through said outlet control means while fluid stored under pressure in said first storage chamber drives said pulsator and biasing means against said bias thereof in a fuel ejecting movement decreasing volume of said pump chamber so that fuel is ejected from the latter chamber through said pressure responsive fuel-egress and anti-backflow means into said combustion chamber.

4. In an internal combustion engine; cylinder means; engine piston means reciprocatively within said cylinder means and having faces respectively forming with said cylinder means a combustion chamber and compression chamber space for pneumatic fluid so that consecutive strokes of reciprocation of said engine piston means are respectively accompanied by increase and decrease in pressure of pneumatic fluid in said compression chamber space; a fuel injector actuation compartment; a fuel injector pump compartment; pulsator and biasing means comprising pump and actuator portions interconnected to move in unison in a stroke under the bias thereof and in a reverse stroke against said bias, said pump portion being movably in said pump compartment forming a pump chamber with said pump compartment and said actuator portion being movably in said actuation compartment partitioning said actuation compartment into first and second storage chambers for fluid; adjustable stroke-limit means for stroke end position of said pulsator and biasing means to be varied; pressure-responsive fuel-influx and anti-backflow means in communication with said pump chamber; pressure-responsive fuel-egress and anti-backflow means having input from said pump chamber and in communication with said combustion chamber for output; pressure-responsive fluid-influx and anti-backflow means having input from said compression space and anti-backflow output to each said first storage chamber and said second storage chamber; and fluid outlet control means in communication with said second storage chamber and operably connected with said engine piston means to open and close said second storage chamber at predetermined times during each cycle of reciprocation of said engine piston means; whereby when said second storage chamber is closed by said fluid outlet control means pressures of fluid in the latter chamber and in said first storage chamber substantially equalize in response to increase in pressure transmitted from said compression chamber space through said pressure-responsive fluid-influx and anti-backflow means and said pulsator and biasing means by movement under said bias thereof increases volume of said pump chamber for fuel to enter said pump chamber through said fuel-influx and anti-backflow means, and whereby when said second storage chamber is opened by said fluid outlet control means pressure of the latter chamber is decreased by discharge of fluid through said outlet control means while fluid stored under pressure in said first storage chamber drives said pulsator and biasing means against said bias thereof in a fuel ejecting movement decreasing volume of said pump chamber so that fuel is ejected from the latter chamber through said pressure-responsive fuel-egress and anti-backflow means into said combustion chamber.

5. In an internal combustion engine; cylinder means; engine piston means reciprocatively within said cylinder means and having faces respectively forming with said cylinder means a combustion chamber and compression chamber space for pneumatic fluid so that consecutive strokes of reciprocation of said engine piston means are respectively accompanied by increase and decrease in pressure of pneumatic fluid in said compression chamber space; a fuel injector actuation compartment; a fuel injector pump compartment; pressure-responsive pulsational means comprising pump and actuator portions interconnected to move in unison in stroke followed by reverse stroke, said pump portion being movably in said pump compartment forming a pump chamber and a balance chamber with said pump compartment and said actuator portion being movably in said actuation compartment partitioning said actuation compartment into first and second storage chambers for fluid, and adjustable stroke-limit means for stroke end position of said pressure-responsive pulsational means to be varied; pressure-responsive fuel-influx and anti-backflow means in communication with said pump chamber and a source of fuel supply; a bleed passage in communication with said balance chamber and said source of fuel supply for pres balance chamber and said source of fuel supply for pressure in response to stroke of said pressure-responsive pulsational means; pressure-responsive fuel-egress and anti-backflow means having input from said pump chamber and in communication with said combustion chamber for output, pressure-responsive fluid-influx and anti-backflow means including first passage and pressure-responsive anti-backflow means in communication with said compression chamber space for input and with said first storage chamber for output, and second passage and pressure-responsive anti-backflow means in communication with said compression chamber space for input and with said second storage chamber for output, said first passage and pressure-responsive anti-backflow means having a smaller total effective orifice to said first storage chamber than said second passage and pressure-responsive anti-backflow means has to said second storage chamber; and fluid outlet control means in communication with said second storage chamber and operably connected with said engine piston means to open and close said second storage chamber at predetermined times during each cycle of reciprocation of said engine piston means; whereby when said second storage chamber is closed by said fluid outlet control means said pressure-responsive pulsational means is actuated in response to increase in pressure transmitted from said compression chamber space through said pressure-responsive fluid-influx and anti-backflow means to increase volume of said pump chamber for fuel to enter said pump chamber through said fuel-influx and anti-backflow means and fluid is stored at the increased pressure in said first and second storage chambers, and whereby when said second storage chamber is opened by said fluid outlet control means pressure of the latter chamber is decreased by discharge of fluid through said outlet control means while fluid stored under pressure in said first storage chamber drives said pressure-responsive pulsational means in a fuel ejecting movement decreasing volume of said pump chamber so that fuel is ejected from the latter chamber through said pressure-responsive fuel-egress and anti-backflow means into said combustion chamber.

6. In an internal combustion engine; cylinder means; engine piston means reciprocatively within said cylinder means and having faces respectively forming with said cylinder means a combustion chamber and chamber space for pneumatic fluid so that each cycle of reciprocation of said engine piston means is accompanied by increase followed by decrease in pressure of pneumatic fluid in said compression chamber space; a fuel injector casing having a partition therein and an actuation compartment and a pump compartment on opposite sides of said partition, said partition having an opening; an injector piston unit reciprocatively within said casing and comprising cylindrical pump and actuator portions and an intermediate cylindrical portion of smaller diameter than said pump and actuator portions interconnecting the latter said portions, said pump portion being in said pump compartment partitioning said pump compartment into a balance chamber and a pump chamber, said actuator portion being in said actuation compartment partitioning said actuation compartment into first and second storage chambers for fluid so that said second storage chamber and said balance chamber are inward having said partition of the casing for a dividing wall and said first storage chamber and said pump chamber are outward beyond corresponding ends of said injector piston unit, and said intermediate portion of the injector piston unit extending through said partition opening and being slidably engaged with said partition closing off said balance chamber and said second storage chamber from each other; means biasing said injector piston unit to move inward toward said first storage chamber; adjustable stroke-limit means projecting into said injector casing for the stroke end position of said injector piston unit attained under bias of said biasing means to be varied; pressure-responsive fuel-influx and anti-backflow means in communication with said pump chamber and a source of fuel supply; a bleed passage in communication with said balance chamber and said source of fuel supply for pressure in said balance chamber to adjust to fuel supply pressure in response to stroke of said pulsator means; pressure-responsive fuel-egress and anti-backflow means having input from said pump chamber and in communication with said combustion chamber for output; pressure-responsive fluid-influx and anti-backflow means including first passage and pressure-responsive anti-backflow means in communication with said compression chamber for output; pressure-responsive fluid-influx and anti-backflow means including first passage and pressure-responsive anti-backflow means in communication with said compression chamber space for input and with said first storage chamber for output, and second passage and pressure-responsive anti-backflow means in communication with said compression chamber space for input and with said second storage chamber for output, said first passage and pressure-responsive anti-backflow means having a smaller total effective orifice to said first storage chamber than said second passage and pressure-responsive anti-backflow means has to said second storage chamber; and fluid outlet control means in communication with said second storage chamber and operably connected with said engine piston means to open and close said second storage chamber at predetermined times during each cycle of reciprocation of said engine piston means; whereby when said second storage chamber is closed by said fluid outlet control means pressures of fluid in the latter chamber and in said first storage chamber substantially equalize in response to increase in pressure transmitted from said compression space through said pressure-responsive fluid-influx and anti-backflow means and said injector piston unit by movement under the bias of said biasing means increases volume of said pump chamber for fuel to enter said pump chamber through said fuel-influx and anti-backflow means, and whereby when said second storage chamber is opened by said fluid outlet control means pressure of the latter chamber is decreased by discharge of fluid through said outlet control means while fluid stored under pressure in said first storage chamber drives said injector piston unit against the bias of said biasing means in a fuel ejecting movement decreasing volume of said pump chamber so that fuel is ejected from the latter chamber through said pressure-responsive fuel-egress and anti-backflow means into said combustion chamber.

7. In an internal combustion engine; cylinder means; power piston means reciprocatively within said cylinder means for power stroke and return stroke per cycle of reciprocation and having faces respectively forming with said cylinder means a combustion chamber having a scavenge air inlet and an exhaust outlet adapted to be opened by said power piston means prior to termination of power stroke thereof and closed by said power piston means prior to termination of return stroke thereof and compression chamber space for pneumatic fluid so arranged that a cycle of reciprocation of said power piston means brings about increase and decrease in pressure of pneumatic fluid in said compression chamber space; pressure-responsive air-admission and anti-backflow means open an intake to the air ambient to the engine and having anti-backflow output to said compression chamber space for admitting air to said compression chamber space per cycle of reciprocation of said power piston means; scavenge air accumulator means having input to said combustion chamber through said scavenge air inlet; pressure-responsive scavenge air egress and anti-backflow means in communication with said compression chamber space and having anti-backflow output to said scavenge air accumulator means; a fuel injector actuation compartment; a fuel injector pump compartment; pressure-responsive pulsational means comprising pump and actuator portions interconnected to move in unison in stroke followed by reverse stroke, said pump portion being movably in said pump compartment forming a pump chamber with said pump compartment and said actuator portion being movably in said actuation compartment partitioning said actuation compartment into first and second storage chambers for fluid; adjustable stroke-limit means in the path of said pressure-responsive pulsational means for stroke end position of said pressure-responsive pulsational means to be varied; pressure-responsive fuel-influx and anti-backflow means in influx anti-backflow communication with said pump chamber and open to a source of fuel supply for input; pressure-responsive fuel-egress and anti-backflow means having input from said pump chamber and in anti-backflow communication with said combustion chamber for output; pressure-responsive air-influx and pressure responsive anti-backflow means including first passage and pressure-responsive anti-backflow means in communication with said compression chamber space for input and in anti-backflow communication with said first storage chamber for output, and second passage and pressure-responsive anti-backflow means in communication with said compression chamber space for input and in anti-backflow communication with said second storage chamber for output; adjustable air bleed-off means having outlet from said accumulator means and so operably connected with said adjustable stroke-limit means to adjust with the latter means that the average pressure of air held available in said accumulator means to said combustion chamber is varied as a function of length of stroke of said pressure-responsive pulsational means for the engine to operate on a substantially constant fuel-air ratio although the quantity of fuel per charge may be varied; and air outlet control means in communication with said second storage chamber and operably connected with said power piston means to open said second storage chamber immediately after said power piston means closes said scavenge air inlet and exhaust outlet of said combustion chamber during return stroke of said power piston means and subsequently to close said second storage chamber each cycle of reciprocation of said power piston means; whereby when said second storage chamber is closed by said air outlet control means said pressure-responsive pulsational means is actuated in response to increase in pressure transmitted from said compression chamber space through said pressure-responsive air-influx and anti-backflow means to increase volume of said pump chamber for fuel to enter said pump chamber through said fuel-influx and anti-backflow means and fluid is stored at the increased pressure in said first and second storage chambers, and whereby when said second storage chamber is opened by said air outlet control means pressure of the latter chamber is decreased by discharge of air through said outlet control means while air stored under pressure in said first storage chamber drives said pressure-responsive pulsational means in a fuel ejecting movement decreasing volume of said pump chamber so that fuel is ejected from the latter chamber through said pressure-responsive fuel-egress and anti-backflow means into said combustion chamber.

8. In a two-stroke-cycle internal combustion free-piston engine; cylinder means; power piston means reciprocatively within said cylinder means for power stroke and return stroke per cycle of reciprocation and having faces respectively forming with said cylinder means a combustion chamber having a scavenge air inlet and an exhaust outlet adapted to be opened by said power piston means prior to termination of power stroke thereof and closed by said power piston means prior to termination of return stroke thereof, pneumatic bounce chamber space, and compression chamber space for pneumatic fluid so arranged that increase in pneumatic pressure in said bounce chamber space and an accompanying decrease in pneumatic pressure in said compression chamber space occur on power stroke of said power piston means and decrease in pneumatic pressure in said bounce chamber space and an accompanying increase in pneumatic pressure in said compression chamber space occur on return stroke of said power piston means; pressure-responsive air-admission and anti-backflow means open on intake to the air ambient to the engine and having anti-backflow output to said compression chamber space for admitting air to said compression chamber space on power stroke by said power piston means; pressure-responsive scavenge air outlet and anti-backflow means in communication with said compression chamber space and having anti-backflow output to said combustion chamber through said scavenge air inlet; a fuel injector actuation compartment; a fuel injector pump compartment; pressure-responsive pulsational means comprising pump and actuator portions interconnected to move in unison in stroke followed by reverse stroke, said pump portion being movably in said pump compartment forming a pump chamber and a balance chamber with said pump compartment and said actuator portion being movably in said actuation compartment partitioning said actuation compartment into first and second storage chambers for fluid; pressure-responsive fuel-influx and anti-backflow means in influx anti-backflow communication with said pump chamber and open to a source of fuel supply for input; pressure-responsive fuel-egress and anti-backflow means having input from said pump chamber and in anti-backflow communication with said combustion chamber for output; pressure-responsive air-influx and anti-backflow means including first passage and pressure-responsive anti-backflow means in communication with said compression chamber space for input and in anti-backflow communication with said first storage chamber for output, and second passage and pressure-responsive anti-backflow means in communication with said compression chamber space for input and in anti-backflow communication with said second storage chamber for output; and air outlet control means in communication with said second storage chamber and operably connected with said power piston means to open said second storage chamber immediately after said power piston means closes said scavenge air inlet and exhaust outlet of said combustion chamber during return stroke of said piston means and subsequently to close said second storage chamber each cycle of reciprocation of said power piston means; whereby when said second storage chamber is closed by said air outlet control means said pressure-responsive pulsational means is actuated in response to increase in pressure transmitted from said compression chamber space through said pressure-responsive air-influx and anti-backflow means to increase volume of said pump chamber for fuel to enter said pump chamber through said fuel-influx and anti-backflow means and fluid is stored at the increased pressure in said first and second storage chambers, and whereby when said second storage chamber is opened by said air outlet control means pressure of the latter chamber is decreased by discharge of air through said outlet control means while air stored under pressure in said first storage chamber drives said pressure-responsive pulsational means in a fuel ejecting movement decreasing volume of said pump chamber so that fuel is ejected from the latter chamber through said pressure-responsive fuel-egress and anti-backflow means into said combustion chamber.

9. In a two-stroke-cycle internal combustion free-piston engine; cylinder means; power piston means reciprocatively within said cylinder means for power stroke and return stroke per cycle of reciprocation and having faces respectively forming with said cylinder means a combustion chamber having a scavenge air inlet and an exhaust outlet adapted to be opened by said power piston means prior to termination of power stroke thereof and closed by said power piston means prior to termination of return stroke thereof, pneumatic bounce chamber space, and compression chamber space for pneumatic fluid so arranged that increase in pneumatic pressure in said bounce chamber space and an accompanying decrease in pneumatic pressure in said compression chamber space occur on power stroke of said power piston means and decrease in pneumatic pressure in said bounce space and an accompanying increase in pneumatic pressure in said compression space occur on return stroke of said power piston means; pressure-responsive air-admission and anti-backflow means open on intake to the air ambient to the engine and having anti-backflow output to said compression chamber space for admitting air to said compression chamber space on power stroke by said power piston means; pressure-responsive scavenge air outlet and anti-backflow means in communication with said compression chamber space and having anti-backflow output to said combustion chamber through said scavenge air inlet; a fuel injector actuation compartment; a fuel injector pump compartment; pressure-responsive pulsational means comprising pump and actuator portions interconnected to move in unison in stroke followed by reverse stroke, said pump portion being movably in said pump compartment forming a pump chamber and a balance chamber with said pump compartment and said actuator portion being movably in said actuation compartment partitioning said actuation compartment into first and second storage chambers for fluid; means in the path of said pressure-responsive pulsational means to limit stroke of said pressure-responsive pulsational means; pressure-responsive fuel-influx and anti-backflow means in influx anti-backflow communication with said pump chamber and open to a source of fuel supply for input; a bleed passage from said balance chamber and in open communication with said source of fuel supply for pressure in said balance chamber to adjust to fuel supply pressure in response to stroke of said pressure-responsive pulsational means; pressure-responsive fuel-egress and anti-backflow means having input from said pump chamber and in anti-backflow communication with said combustion chamber for output, pressure-responsive air-influx and anti-backflow means including first passage and pressure-responsive anti-backflow means in communication with said compression chamber space for input and in anti-backflow communication with said first storage chamber for output, and second passage and pressure-responsive anti-backflow means in communication with said compression chamber space for input and in anti-backflow communication with said second storage chamber for output, said first passage and pressure-responsive anti-backflow means having a smaller total effective orifice to said first storage chamber than said second passage and pressure-responsive anti-backflow means has to said second storage chamber; and air outlet control means in communication with said second storage chamber and operably connected with said power piston means to open said second storage chamber immediately after said power piston means closes said scavenge air inlet and exhaust outlet of said combustion chamber during return stroke of said piston means and subsequently to close said second storage chamber each cycle of reciprocation of said power piston means; whereby when said second storage chamber is closed by said air outlet control means said pressure-responsive pulsational means is actuated in response to increase in pressure transmitted from said compression chamber space through said pressure-responsive air-influx and anti-backflow means to increase volume of said pump chamber for fuel to enter said pump chamber through said fuel-influx and anti-backflow means, and fluid is stored at the increased pressure in said first and second storage chambers, and whereby when said second storage chamber is opened by said air outlet control means pressure of the latter chamber is decreased by discharge of air through said outlet control means while air stored under pressure in said first storage chamber drives said pressure-responsive pulsational means in a fuel ejecting movement decreasing volume of said pump chamber so that fuel is ejected from the latter chamber through said pressure-responsive fuel-egress and anti-backflow means into said combustion chamber.

10. In a two-stroke-cycle internal combustion free-piston engine; cylinder means; power piston means reciprocatively within said cylinder means for power stroke and return stroke per cycle of reciprocation and having faces respectively forming with said cylinder means a combustion chamber having a scavenge air inlet and an exhaust outlet adapted to be opened by said power piston means prior to termination of power stroke thereof and closed by said power piston means prior to termination of return stroke thereof, pneumatic bounce chamber space, and compression chamber space for pneumatic fluid so arranged that increase in pneumatic pressure in said bounce chamber space and an accompanying decrease in pneumatic pressure in said compression chamber space occur on power stroke of said power piston means and decrease in pneumatic pressure in said bounce chamber space and an accompanying increase in pneumatic pressure in said compression chamber space occur on return stroke of said power piston means; pressure-responsive air-admission and anti-backflow means open on intake to the air ambient to the engine and having anti-backflow output to said compression chamber space for admitting air to said compression space on power stroke by said power piston means; scavenge air accumulator means being input to said combustion chamber through said scavenge air inlet; pressure-responsive scavenge air egress and anti-backflow means in communication with said compression chamber space and having anti-backflow output to said scavenge air accumulator means; a fuel injector actuation compartment; a fuel injector pump compartment; pressure-responsive pulsational means comprising pump and actuator portions interconnected to move in unison in stroke followed by reverse stroke, said pump portion being movably in said pump compartment forming a pump chamber with said pump compartment and said actuator portion being movably in said actuation compartment partitioning said actuation compartment into first and second storage chambers for fluid; adjustable stroke-limit means in the path of said pressure-responsive pulsational means for stroke end position of said pressure-responsive pulsational means to be varied; pressure-responsive fuel-influx and anti-backflow means in influx anti-backflow communication with said pump chamber and open to a source of fuel supply for input; pressure-responsive fuel-egress and anti-backflow means having input from said pump chamber and in anti-backflow communication with said combustion chamber for output; pressure-responsive air-influx and anti-backflow means including first passage and pressure-responsive anti-backflow means in communication with said compression chamber space for input and in anti-backflow communication with said first storage chamber for output, and second passage and pressure-responsive anti-backflow means in communication with said compression chamber space for input and in anti-backflow communication with said second storage chamber for output; adjustable air bleed-off means having outlet from said accumulator means and so operably connected with said adjustable stroke-limit means to adjust with the latter means that the average pressure of air held available in said accumulator means to said combustion chamber is varied as a function of length of stroke of said pressure-responsive pulsational means for the engine to operate on a substantially constant fuel-air rates although the quantity of fuel per se may be varied; and air outlet control means in communication with said second storage chamber and operably connected with said power piston means to open said second storage chamber immediately after said power piston means closes said scavenge air inlet and exhaust outlet of said combustion chamber during return stroke of said power piston means and subsequently to close said second storage chamber each cycle of reciprocation of said power piston means; whereby when said second storage chamber is closed by said air outlet control means said pressure-responsive pulsational means is actuated in response to increase in pressure transmitted from said compression chamber space through said pressure-responsive air-influx and anti-backflow means to increase volume of said pump chamber for fuel to enter said pump chamber through said fuel-influx and anti-backflow means and fluid is stored at the increased pressure in said first and second storage chambers, and whereby when said second storage chamber is opened by said air outlet control means pressure of the latter chamber is decreased by discharge of air through said outlet control means while air stored under pressure in said first storage chamber drives said pressure-responsive pulsational means in a fuel ejecting movement decreasing volume of said pump chamber so that fuel is ejected from the latter chamber through said pressure-responsive fuel-egress and anti-backflow means into said combustion chamber.

11. In a two-stroke-cycle internal combustion free-piston engine; cylinder means; power piston means reciprocatively within said cylinder means for power stroke and return stroke per cycle of reciprocation and having faces respectively forming with said cylinder means a combustion chamber having a scavenge air inlet and an exhaust outlet adapted to be opened by said power piston means prior to termination of power stroke thereof and closed by said power piston means prior to termination of return stroke thereof, pneumatic bounce chamber space, and compression chamber space for pneumatic fluid so arranged that increase in pneumatic pressure in said bounce chamber space and an accompanying decrease in pneumatic pressure in said compression chamber space occur on power stroke of said power piston means and decrease in pneumatic pressure in said bounce chamber space and an accompanying increase in pneumatic pressure in said compression chamber space occur on return stroke of said power piston means; pressure-responsive air-admission and anti-backflow means open on intake to the air ambient to the engine and having anti-backflow output to said compression chamber space for admitting air to said compression chamber space on power stroke by said power piston means; scavenge air accumulator means having input to said combustion chamber through said scavenge air inlet; pressure-responsive scavenge air egress and anti-backflow means in communication with said compression chamber space and having anti-backflow output to said scavenge air accumulator means; a fuel injector actuation compartment; a fuel injector pump compartment; pulsator and biasing means comprising pump and actuator portions interconnected to move in unison in a stroke under the bias thereof and in a reverse stroke against said bias, said pump portion being movably in said pump compartment forming a pump chamber and a balance chamber with said pump compartment and said actuator portion being movably in said actuation compartment partitioning said actuation compartment into first and second storage chambers for fluid; adjustable stroke-limit means in the path of said pulsator means for stroke end position of said pulsator and biasing means to be varied; pressure-responsive fuel-influx and anti-backflow means in influx anti-backflow communication with said pump chamber and open to a source of fuel supply for input; a bleed passage from said balance chamber and in open communication with said source of fuel supply for pressure in said balance chamber to adjust to fuel supply pressure in response to stroke of said pulsational and biasing means; pressure-responsive fuel-egress and anti-backflow means having input from said pump chamber and in anti-backflow communication with said combustion chamber for output; pressure-responsive air-influx and anti-backflow means including first passage and pressure-responsive anti-backflow means in communication with said compression chamber space for input and in anti-backflow communication with said first storage chamber for output, and second passage and pressure-responsive anti-backflow means in communication with said compression chamber space for input and in anti-backflow communication with said second storage chamber for output, said first passage and pressure-responsive anti-backflow means having a smaller total effective orifice to said first storage chamber than said second passage and pressure-responsive anti-backflow means has to said second storage chamber; adjustable air bleed-off means having outlet from said accumulator means and so operably connected with said adjustable stroke-limit means to adjust with the latter means that the average pressure of air held available in said accumulator means to said combustion chamber is varied as a function of length of stroke of said pulsator and biasing means for the engine to operate on a substantially constant fuel-air ratio although the quantity of fuel per charge may be varied; and air outlet control means in communication with said second storage chamber and operably connected with said power piston means to open said second storage chamber immediately after said power piston means closes said scavenge air inlet and exhaust outlet of said combustion chamber during return stroke of said power piston means and subsequently to close said second storage chamber each cycle of reciprocation of said power piston means; whereby when said second storage chamber is closed by said air outlet control means pressures of air in the latter chamber and in said first storage chamber substantially equalize in response to increase in pressure transmitted from said compression chamber space through said pressure-responsive air-influx and anti-backflow means and said pulsator and biasing means by movement under said bias thereof increases volume of said pump chamber for fuel to enter said pump chamber through said fuel-influx and anti-backflow means, and whereby when said second storage chamber is opened by said air outlet control means pressure of the latter chamber is decreased by discharge of air through said outlet control means while air stored under pressure in said first storage chamber drives said pulsator and biasing means against said bias thereof in a fuel ejecting movement decreasing volume of said pump chamber so that fuel is ejected from the latter chamber through said pressure-responsive fuel-egress and anti-backflow means into said combustion chamber.

12. In a two-stroke-cycle internal combustion free-piston engine; cylinder means; power piston means reciprocatively within said cylinder means for power stroke and return stroke per cycle of reciprocation and having faces respectively forming with said cylinder means a combustion chamber having a scavenge air inlet and an exhaust outlet adapted to be opened by said power piston means prior to termination of power stroke thereof and closed by said power piston means prior to termination of return stroke thereof, pneumatic bounce chamber space, and compression chamber space for pneumatic fluid so arranged that increase in pneumatic pressure in said bounce chamber space and an accompanying decrease in pneumatic pressure in said compression chamber space occur on power stroke of said power piston means and decrease in pneumatic pressure in said bounce chamber space and an accompanying increase in pneumatic pressure in said compression chamber space occur on return stroke of said power piston means;

pressure-responsive air-admission and anti-backflow means open on intake to the air ambient to the engine and having anti-backflow output to said compression space for admitting air to said compression space on power stroke by said power piston means; scavenge air accumulator means having input to said combustion chamber through said scavenge air inlet; pressure-responsive scavenge air egress and anti-backflow means in communication with said compression space and having anti-backflow output to said scavenge air accumulator means; a fuel injector actuation compartment; a fuel injector pump compartment; pulsator and biasing means comprising pump and actuator portions interconnected to move in unison in a stroke under the bias thereof and in a reverse stroke against said bias, said pump portion being movably in said pump compartment forming a pump chamber with said pump compartment and said actuator portion being movably in said actuation compartment partitioning said actuation compartment into first and second storage chambers for fluid; pressure-responsive fuel-influx and anti-backflow means in influx anti-backflow communication with said pump chamber and open to a source of fuel supply for input; pressure-responsive fuel-egress and anti-backflow means having input from said pump chamber and in anti-backflow communication with said combustion chamber for output; pressure-responsive air-influx and anti-backflow means including first passage and pressure-responsive anti-backflow means in communication with said compression chamber space for input and in anti-backflow communication with said first storage chamber for output, and second passage and pressure-responsive anti-backflow means in communication with said compression chamber space for input and in anti-backflow communication with said second storage chamber for output; and air outlet control means in communication with said second storage chamber and operably connected with said power piston means to open said second storage chamber immediately after said power piston means closes said scavenge air inlet and exhaust outlet of said combustion chamber during return stroke of said piston means and closing to said second storage chamber before said power piston means opens said scavenge air inlet and exhaust outlet on the ensuing power stroke and remaining closed to said second storage chamber until immediately after said power piston means has closed said scavenge air inlet and exhaust outlet on the next return stroke; whereby when said second storage chamber is closed by said air outlet control means pressures of air in the latter chamber and in said first storage chamber substantially equalize in response to increase in pressure transmitted from said compression chamber space through said pressure-responsive air-influx and anti-backflow means and said pulsator and biasing means by movement under said bias thereof increases volume of said pump chamber for fuel to enter said pump chamber through said fuel-influx and anti-backflow means, and whereby when said second storage chamber is opened by said air outlet control means pressure of the latter chamber is decreased by discharge of air through said outlet control means while air stored under pressure in said first storage chamber drives said pulsator and biasing means against said bias thereof in a fuel ejecting movement decreasing volume of said pump chamber so that fuel is ejected from the latter chamber through said pressure-responsive fuel-egress and anti-backflow means into said combustion chamber.

13. In a two-stroke-cycle internal combustion free-piston engine; cylinder means; power piston means reciprocatively within said cylinder means for power stroke and return stroke per cycle of reciprocation and having faces respectively forming with said cylinder means a combustion chamber having a scavenge air inlet and an exhaust outlet adapted to be opened by said power piston means prior to termination of power stroke thereof and closed by said power piston means prior to termination of return stroke thereof, pneumatic bounce chamber space, and scavenge air re-bounce chamber space so arranged that increase in pneumatic pressure in said bounce chamber space and an accompanying decrease in pneumatic pressure in said scavenge air re-bounce chamber space occur on power stroke of said power piston means and decrease in pneumatic pressure in said bounce chamber space and an accompanying increase in pneumatic pressure in said scavenge air-rebounce chamber space occur on return stroke of said power piston means; pressure-responsive air-admission and anti-backflow means open an intake to the air ambient to the engine and having anti-backflow output to said scavenge air re-bounce chamber space for admitting air to said scavenge air re-bounce chamber space on power stroke by said power piston means; scavenge air accumulator means having input to said combustion chamber through said scavenge air inlet; pressure responsive scavenge air egress and anti-backflow means in communication with said scavenge air re-bounce chamber space through an opening in the wall of said cylinder means at a location transversed by said power piston means said opening being closed by said power piston means in return stroke after said power piston means has closed said combustion chamber scavenge air inlet and exhaust outlet and having anti-backflow output to said scavenge air accumulator means, whereby before said opening is closed by said piston means in return stroke thereby said accumulator means stores air under pressure from said scavenge air re-bounce chamber and after said opening is closed by said piston means said scavenge air re-bounce chamber acts as a re-bounce chamber for the remaining travel of said piston means on return stroke and stores pneumatic pressure available to contribute energy to the next power stroke of said piston means; a fuel injector actuation compartment; a fuel injector pump compartment; pulsator and biasing means comprising pump and actuator portions interconnected to move in unison in a stroke under the bias thereof and in a reverse stroke against said bias, said pump portion being movably in said pump compartment forming a pump chamber with said pump compartment and said actuator portion being movably in said actuation compartment partitioning said actuation compartment into first and second storage chambers for fluid; pressure-responsive fuel-influx and anti-backflow means in influx anti-backflow communication with said pump chamber and open to a source of fuel supply for input; pressure-responsive fuel egress and anti-backflow means having input from said pump chamber and in anti-backflow communication with said combustion chamber for output; pressure-responsive air-influx and anti-backflow means including first passage and pressure-responsive anti-backflow means in communication with said scavenge air re-bounce chamber space for input and in anti-backflow communication with said first storage chamber for output, and second passage and pressure-responsive anti-backflow means in communication with said scavenge air re-bounce chamber space for input and in anti-backflow communication with said second storage chamber for output; and air outlet control means in communication with said second storage chamber and operably connected with said power piston means to open said second storage chamber immediately after said power piston means closes said scavenge air inlet and exhaust outlet of said combustion chamber during return stroke of said piston means and subsequently to close said storage chamber each cycle of reciprocation of said power piston means; whereby when said second storage chamber is closed by said air outlet control means pressure of air in the latter chamber and in said first storage chamber substantially equalize in response to increase in pressure transmitted from said scavenge air re-bounce chamber space through said pressure-responsive air-influx and anti-backflow means and said pulsator and biasing means by movement under said bias thereof increases volume of said pump chamber for fuel to enter said pump chamber through said fuel-ingress and anti-backflow means, and whereby when said second storage chamber is opened by said air outlet control means pressure of the latter chamber is decreased by discharge of air through said outlet control means while air stored under pressure in said first storage chamber drives said pulsator and biasing means against said bias thereof in a fuel ejecting movement decreasing volume of said pump chamber so that fuel is ejected from the latter chamber through said pressure-responsive fuel-egress and anti-backflow means into said combustion chamber.

14. In a two-stroke-cycle internal combination free-piston engine; the combination as set forth in claim 13, wherein said pressure-responsive air-influx and anti-backflow means in communication with said scavenge air re-bounce chamber space for input and in anti-backflow communication with said first storage chamber for output, and second passage and pressure-responsive anti-backflow means in communication with said scavenge air re-bounce chamber space for input and in anti-backflow communication with said second storage chamber for output, is further characterized by having said first and second passages so connected with said scavenge air re-bounce chamber space as to remain open to the portion thereof which acts as a re-bounce chamber space after said opening in the wall of said cylinder means has been closed by said power piston means in return stroke, so that the pressure thus transmitted to said first and second storage chambers by said pressure-responsive air-influx and anti-backflow means is within the range of engine re-bounce pressure.

References Cited in the file of this patent
UNITED STATES PATENTS

| | | |
|---|---|---|
| 2,435,970 | Lewis | Feb. 17, 1948 |
| 2,497,091 | Morain | Feb. 14, 1950 |